Jan. 18, 1966  N. S. ROBSON ETAL  3,229,786
ADJUSTABLE FEED SEQUENTIAL FLUID DISTRIBUTION MEANS
Filed Nov. 1, 1963  2 Sheets-Sheet 1

INVENTOR.
NORMAN S. ROBSON
JAMES J. CALLAHAN
BY
ATTORNEYS

United States Patent Office 3,229,786
Patented Jan. 18, 1966

3,229,786
ADJUSTABLE FEED SEQUENTIAL FLUID
DISTRIBUTION MEANS
Norman S. Robson, Cleveland, and James J. Callahan, Mentor, Ohio, assignors to Trabon Engineering Corporation, Solon, Ohio, a corporation of Ohio
Filed Nov. 1, 1963, Ser. No. 320,662
3 Claims. (Cl. 184—7)

This invention relates to lubricating systems and units thereof. The lubricating systems to which the invention relates include fluid distributor means having a fluid supply header for receiving lubricant from a supply source and are provided with lines leading from the distributor to the several stations (such as bearings or the like, or subsidiary distributors) which are to be supplied with lubricant.

The invention has reference to distributors of the type which are referred to as sequential or series or cycling distributors. Such sequential or cycling distributors are shown for example in U.S. Patents 2,146,424; 2,792,911; 3,025,929; and 3,074,509. These cycling distributors are also sometimes referred to as being of the manifold series type. They have advantages over other types of systems such as dual line systems or spring return systems.

An advantage of cycling type lubricant distributors is that accurate proportioning is assured even under varying conditions of back pressure and the like since each unit of the distributor continues to block off operation of a succeeding unit in the operative cycle until such time as the first unit has discharged its measure of lubricating fluid. The relationship is a positive one in the sense that the first unit must substantially exhaust its measure of lubricating fluid before the second unit can operate.

It is desirable to make sequential or series or cycling type systems readily adjustable so that the proportions of lubricant discharged from the several units of the distributor may be varied.

Adjustments of a steplike or incremental nature have been provided by providing various axial dimensions for the lands of the valve and plunger units as in U.S. Patent 2,834,433 or by providing various bore sizes for individual valve and plunger units. Adjustment requires a change-over from one size to the other.

Prior devices have provided for continuous-range adjustment of lubricant discharge from distributors of the cycling type. However these devices have compromised the feature of positiveness, which is a great advantage of cycling type distributors. In such prior proposals, the arrangement has not been such that the first unit (and measuring chambers associated therewith) must substantially exhaust its adjusted measures of lubricating fluid before the second unit can operate. An example is FIGURE 5 of U.S. Patent 2,146,424.

The present invention contemplates provision for ready adjustment over a continuous range of the measure of lubricant which must be discharged from one or more units, the discharge of such adjusted measure of fluid being a necessary condition of continued operation of the distributor at all adjustments.

Figure 1:
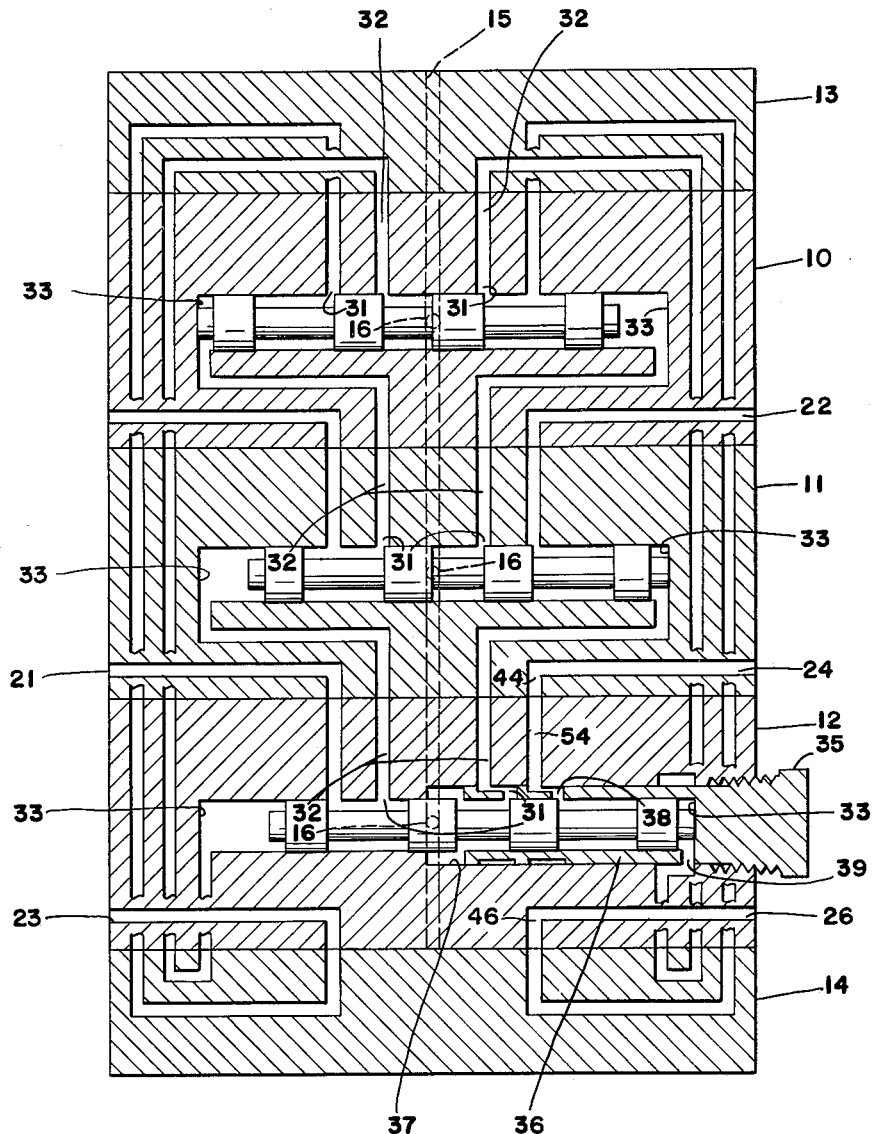
FIGURE 1 is a schematic sectional view of a distributor embodying the invention.

The device shown in FIGURE 1 includes distributor units 10, 11 and 12 together with end blocks 13 and 14. The block 13 is an inlet end block having a header passage 15 which extends down through the blocks 10, 11 and 12 but is closed off by the block 14. Suitable gaskets, O-rings, or the like may be provided to furnish suitable sealing between the faces of the various blocks.

Of course the separate valve and plunger units or blocks 10, 11 and 12 together with the end blocks may be combined in unitary distributors, rather than forming separate blocks. The sequential operation of the device shown in FIGURE 1 will be understood by those who are familiar with the operation of lubricant distributors of the cycling type. With the parts in the position shown, as lubricant is fed into the header passage 15 (which connects with the bores of the various units through the openings 16), it will be distributed sequentially and in a definite proportion to outlet lines leading from the outlet ports 21 through 26 inclusive, and in the same sequence as the outlet ports are numbered.

The units 10–12 of the distributor each have ports 31 associated with in-out lines 32. The lines 32 may appropriately be referred to as in-out lines since the flow of the lubricating fluid within them reverses during the sequential operation of the distributor, while the flow in the remaining lines is generally unidirectional although intermittent.

Each of the units includes end-stop-defining means for limiting the back and forth endwise movement of the plungers. In the schematic cross-section of FIGURE 1, this means is illustrated simply as the bore endwalls 33. For convenience and low cost of fabrication, individual plugs may be provided as shown in Patent 2,146,424.

It should be understood that the present invention applies to distributors having different numbers of valve and plunger units. Some of the units may be of the type shown for example in FIGURE 18 of U.S. Patent 3,025,929, such units being of the type where there is not direct communication from the fluid supply header 15 to the center or near-center of the plunger bore. In this latter type of unit, or in the units illustrated in FIGURE 1, there may be provided an adjustment of the volume displaced during each operation of the unit. The adjustment may be over a continuous range of displacement values. The adjustment is accomplished in such a way as to make the discharge of the adjusted measure a condition precedent to continued operation of the distributor.

According to the invention, a unit of the type shown in FIGURE 18 of U.S. Patent 3,025,929 or a unit of the type shown in the distributor of FIGURE 1 is provided with means for shifting through equal distances the positions of (1) the port means at which at least one of its in-out lines is, in the operation of the unit, connected for infeeding of fluid and (2) that associated end-stop-defining means which is approached by the principal moving part of the unit when said at least one in-out line is connected for infeed of fluid. This changes the distance of back-and-forth movement of the principal moving parts of the unit and adjusts the measure of lubricant which must be discharged from the unit as a condition precedent to further sequencing of lubricant flow through the distributor.

In the distributor shown in FIGURE 1, item (1) just mentioned will be seen to be the right hand port 31 and item (2) will be seen to be the right hand endwall 33.

In the illustrated example, the right hand endwall 33 and the right hand port 31 both move together to effect the adjustment. They are both carried on or formed as part of a member 35 which is threadedly received in the end of the unit 12 and which has a sleeve portion 36 adapted to be adjustably positioned within an enlarged bore portion 37. The feed adjustment depends upon the extent to which the member 35 is turned into or backed out of the unit 12. The setting for maximum feed is shown in FIGURE 1 and also in FIGURE 2.

Figure 2:
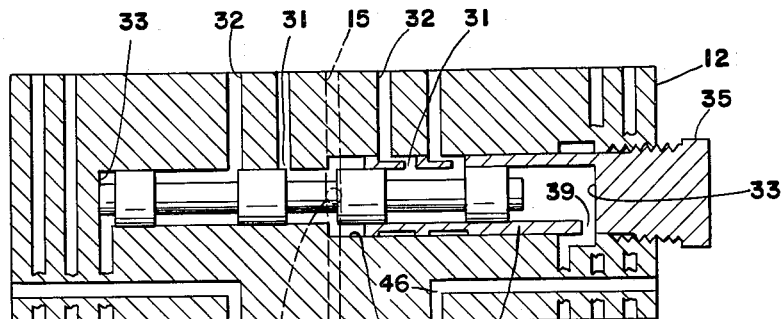
FIGURES 2–4 are schematic sectional views of one of the distributor units shown in FIGURE 1 with the parts in different adjusted or operative positions.
Figure 3:
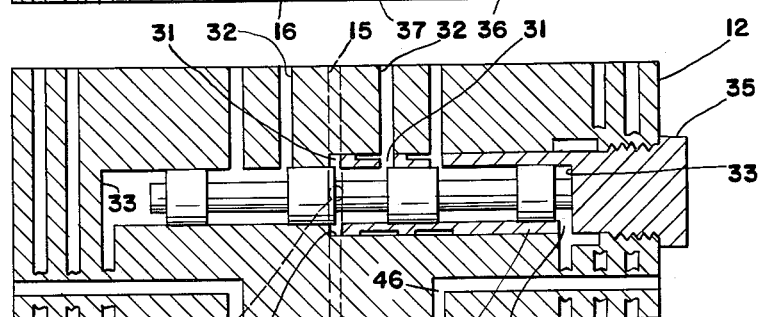
Figure 4:
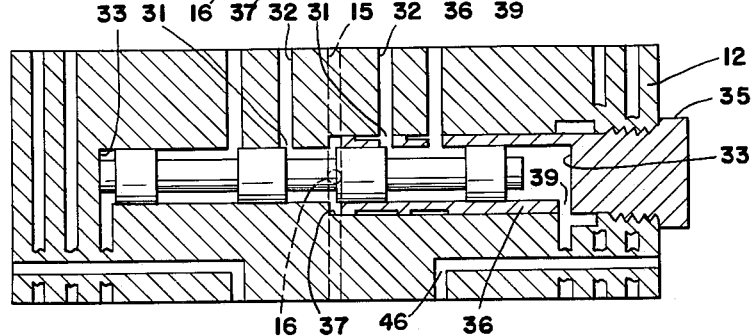

The setting for minimum feed is shown in FIGURE 3 and also in FIGURE 4. FIGURES 1 and 2 respectively illustrate alternate end stop positions of the principal moving parts (plunger) of the unit 12 when at maximum feed adjustment. FIGURES 3 and 4 respectively illustrate alternate end stop positions of the plunger when at minimum feed adjustment. Increase or decrease of adjustment affects the measures of the discharges from both the outlet 23 and the outlet 26 on each complete cycle of operation of the distributor.

Figure 5:
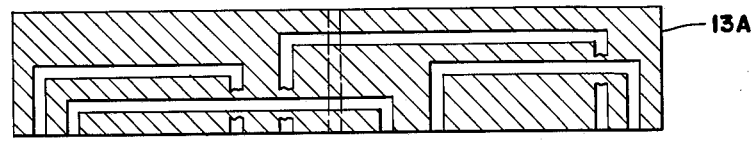
FIGURE 5 is a schematic sectional view of an alternate end block.

Obviously additional units may be provided with adjustment means equivalent to the adjustment means 35. In the particular distributor illustrated, when an even number of distributor units such as the units 10–12 is employed, it is desirable to employ a "crossover" type of M-block 13A (FIGURE 5) as a substitute for the block 13 shown in FIGURE 1 in order to obtain cycling action. Where three-lobe units or the like are employed for all the units of the distributor, then the one "crossover" of the end block of 13A will always suffice for proper cycling if there are no other crossovers, and the end block 13A may be used for distributors consisting of even or odd numbers of blocks. These alternatives are not important to the present invention except that it should be understood that the invention is applicable to distributors embodying these various known combinations.

It may be noted that the port 38 can shift with the port 31 as shown, but that this is not necessary. Even if the port 38 maintained at all times the longitudinal position shown in FIGURE 1, the distributor would operate. Nor does the invention require that the port 39 necessarily shift with the sleeve.

The block 12 may be arranged to close off its port 26 as with a plug (not shown) and, instead, connect the supply line 46 for the port 26 to the line 44 which supplies the port 24 of the next block or unit (which is unit 11 in the illustrated case). Preferably this connection is accomplished by an internal drilled passage between the line 46 and the line 54 (the latter forms the upstream portion of the line 44). Such an internal drilled passage is not shown, but it may simply be a drilled vertical extension of the vertical portion of line 46 shown in FIGURE 1. Such vertical extension is drilled, of course, prior to insertion of the plunger and the element 35.

Similarly the port 23 may be closed and its supply line connected to the supply line for the port 21.

The result is that addition of the so-modified block 12 merely makes the discharge of the unit 11 adjustable. If the ports and plunger lobes and end stops of the modified unit 12 are proportioned so as to make the minimum discharge capacity of the unit 12 a small value, addition of the unit 12 (having the closed-off discharge ports and the cross connections above referred to) to an already installed distributor consisting of a number of units such as the units 10 and 11 merely has the effect of making the endmost unit 10 or 11 an adjustable discharge unit adjustable upwardly from approximately the original fixed capacity of such adjacent unit 10 or 11— and all without breaking any connections of the lubricant discharge lines leading from the outlet ports of such already installed distributor. It will be understood that such a previously existing distributor, to which a so-modified block 12 is later added, should in itself consist of at least three valve-and-plunger units at the time of its original installation.

Valve-and-plunger units including at least one of the adjustable type exemplified by the illustrated unit 12 may be combined in a unitary assembly rather than being in separate blocks. Conversely, the units of a distributor may not be only separate blocks but the blocks may be connected by interconnecting fluid lines rather than by face-to-face joints as in the illustrated example.

The invention is not restricted to the slavish imitation of each and every one of the details described above which have been set forth merely by way of example with the intent of most clearly setting forth the teaching of the invention. Obviously devices may be provided which change, eliminate or add mechanical structure without departing from the invention.

What is claimed is:

1. A lubricant distributor comprising a plurality of valve-and-plunger units fed from a fluid source and operating together as a cycling distributor, each unit having means defining end stop positions of its principal moving parts, each unit having in-out lines leading from valve means of such unit to end chambers of another unit, each in-out line being alternately connected for infeeding and outfeeding of fluid at alternate end stop positions of said each unit, at least one of said units having adjustment means for shifting through equal distances the positions of (1) the port means at which at least one of the unit's in-out lines is, in the operation of the unit, connected for infeeding of fluid and (2) that associated end-stop-defining means which is approached by the principal moving parts of said at least one unit when said at least one in-out line is connected for infeeding of fluid, to thereby change the distance of back-and-forth movement of the principal moving parts of said valve-and-plunger unit while maintaining positive sequencing of lubricant flow through said distributor and thereby positively adjusting the measure of lubricant which must be discharged from said unit as a condition to continued operation of said distributor.

2. A device as defined in claim 1 in which the adjustment means constitutes means for structurally associating the said items (1) and (2) for longitudinal movement with each other.

3. A valve-and-plunger unit for a lubricant distributor of the cycling type, said unit having means defining end stop positions of its principal moving parts, the unit having in-out lines leading from valve means of the unit for connection to end chambers of another unit, each in-out line being alternately connected for infeeding and outfeeding of fluid at alternate end stop positions of the unit, the unit having adjustment means for shifting through equal distances the positions of (1) the port means at which at least one of the unit's in-out lines is, in the operation of the unit, connected for infeeding of fluid and (2) that associated end-stop-defining means which is approached by the principal moving parts of the unit when said at least one in-out line is connected for infeeding of fluid, to thereby change the distance of back-and-forth movement of the principal moving parts of the unit while maintaining positive sequencing of lubricant flow through a distributor in which the unit is employed and thereby positively adjusting the measure of lubricant which must be discharged from the unit as a condition to continued operation of a distributor in which the unit is employed.

No references cited.

LAVERNE D. GEIGER, *Primary Examiner.*

MILTON KAUFMAN, *Examiner.*